(12) United States Patent
Mizuno

(10) Patent No.: US 7,088,105 B2
(45) Date of Patent: Aug. 8, 2006

(54) SYSTEM AND METHOD FOR LOCATING UNDERGROUND UTILITIES CARRYING PASSIVE SIGNALS

(75) Inventor: Morio Mizuno, Higashi-Machi (JP)

(73) Assignee: McLaughlin Manufacturing Company, Inc., Greenville, SC (US)

( * ) Notice: Subject to any disclaimer, the term of this patent is extended or adjusted under 35 U.S.C. 154(b) by 0 days.

(21) Appl. No.: 10/871,491

(22) Filed: Jun. 18, 2004

(65) Prior Publication Data
US 2004/0227517 A1  Nov. 18, 2004

Related U.S. Application Data

(63) Continuation of application No. 10/263,154, filed on Oct. 2, 2002, now abandoned.

(51) Int. Cl.
*G01V 3/08* (2006.01)
(52) U.S. Cl. .......................... 324/329; 324/67
(58) Field of Classification Search ........... 324/66–67, 324/326–329, 232, 233, 335; 455/103, 107, 455/121, 123, 125
See application file for complete search history.

(56) References Cited

U.S. PATENT DOCUMENTS

| | | | |
|---|---|---|---|
| 3,617,865 A | 11/1971 | Hakata | 324/3 |
| 3,836,842 A | 9/1974 | Zimmermann et al. | 324/239 |
| 4,672,321 A | 6/1987 | Howell | 324/326 |
| 5,231,355 A | 7/1993 | Rider et al. | 324/326 |
| 5,264,795 A | 11/1993 | Rider | 324/326 |
| 5,361,029 A | 11/1994 | Rider et al. | 324/326 |
| 5,430,379 A * | 7/1995 | Parkinson et al. | 324/329 |
| 5,711,381 A | 1/1998 | Archambeault et al. | 175/45 |
| 5,720,354 A | 2/1998 | Stump et al. | 175/26 |
| 6,102,136 A | 8/2000 | Archambeault et al. | 175/45 |
| 6,130,539 A * | 10/2000 | Polak | 324/326 |
| 6,407,550 B1 * | 6/2002 | Parakulam et al. | 324/326 |
| 6,954,072 B1 * | 10/2005 | Schlapp et al. | 324/329 |

FOREIGN PATENT DOCUMENTS

UA  1056768  1/1967  ...............  324/67

OTHER PUBLICATIONS

Operation Manual for "Micro-Computerized Pipe & Cable Locator," Takachiho Sangyo Co., LTD.

* cited by examiner

*Primary Examiner*—Jay M. Patidar
(74) *Attorney, Agent, or Firm*—Nelson Mullins Riley & Scarborough, LLP

(57) ABSTRACT

In a method of identifying a passive electromagnetic signal emitted from an underground utility, a portable above-ground antenna is disposed at a location at which the passive electromagnetic signal is expected. Measurement signals are received from the antenna corresponding to electromagnetic signals received by the antenna. The measurement signals are measured at a plurality of different frequency bands within a measurement frequency range expected to include a frequency of the passive electromagnetic signal, and at least one of the plurality of frequency bands is selected based on a predetermined criteria applied to the measurements.

28 Claims, 8 Drawing Sheets

SYSTEM AND METHOD FOR LOCATING UNDERGROUND UTILITIES CARRYING PASSIVE SIGNALS

This is a continuation of U.S. application Ser. No. 10/263,154 filed Oct. 2, 2002, now abandoned the entire disclosure of which is incorporated by reference herein.

BACKGROUND OF THE INVENTION

Underground utility lines may emit passive electromagnetic signals for various reasons. An electric utility, for example, carries its own electric signal at 50–60 Hz. Other utility lines emit electromagnetic fields within a frequency range of 13 to 22 kHz responsively to ambient fields that induce signals on the utility. Gas providers typically place 100–120 Hz signals on gas lines to provide cathodic protection against corrosion. CATV lines typically carry signals at about 31 kHz. As used herein, any electromagnetic field emitted by a utility line, whether generated by signals carried directly by the utility or by signals induced on the utility by signals ambient to the utility, where the signal is not applied by a cable location system for the purpose of locating the cable, is considered a "passive" signal.

It is known to provide an above-ground portable locator having an antenna tuned to receive signals within a desired frequency range for locating the underground utility. Typically, the operator has a general idea of the underground utility's location. If so, the operator carries the locator so that the antenna is parallel to the ground and perpendicular to the expected line of the utility and walks generally perpendicular to the expected line. The operator views a signal intensity display on the locator and finds the position at which a peak signal appears. At that point, the above-ground position may be marked and a depth reading taken. Where the operator does not know the utility's general location, he may find the utility by walking in a grid pattern while carrying the locator so that the antenna is parallel to the ground. The operator first walks in parallel lines over the area. If he does not find a peak value, he may be carrying the antenna parallel to the utility. Since underground lines emit a generally cylindrical magnetic field, the magnetic flux lines are perpendicular to the coil antenna's axis in this orientation and do not induce a significant signal in the antenna. Thus, the operator then turns 90° and walks in parallel paths over the same area. In such a pattern, the antenna is more likely to be perpendicular to the utility and therefore more likely to detect a peak signal. Of course, the operator may not be exactly parallel or exactly perpendicular to the utility in either direction. By using the grid pattern, however, the operator should be able to cross over the utility with the antenna at such an angle that a peak can de detected. At such a point, the operator may rotate the locator about a vertical axis until the antenna is perpendicular to the utility and a maximum signal is measured. Thus, the locator's orientation notifies the operator of the utility's direction. An example of a system capable of locating existing underground utility lines carrying active or passive signals is described in U.S. Pat. No. 6,102,136, the entire disclosure of which is incorporated by reference herein.

FIG. 1 schematically illustrates components of a portable above-ground locator 10 used to detect passive signals within a frequency range of 13 to 22 kHz resulting from ambient radio frequency signals. A coil antenna 12 receives electromagnetic signals emitted by the utility line, generates a signal responsively thereto and outputs the signal to an amplifier 14 and a pair of bandpass filters 16 and 18. Filter 16 has a bandpass range of 13 to 17 kHz, while filter 18 passes a range of 18 to 22 kHz. Two bandpass filters are used, as opposed to a single filter of larger bandwidth, to improve the signal-to-noise ratio. A multiplexer 20 selects the output of either of the two filters, depending on instructions received from a CPU 22 controlled by the operator through a keyboard at the locator display. Multiplexer 20 directs the signal from the selected filter to an analog-to-digital converter 24, and the resulting digital signal passes to CPU 22. The locator includes a display 26 that indicates the strength of the signal detected by antenna 12 so that the operator may locate a signal peak and, therefore, a point above the underground utility.

The locator may also be used to locate signals in other frequency ranges. Generally, the locator includes low pass and bandpass filters, which are configured to pass the respectively desired frequency ranges, in parallel with filters 16 and 18. The CPU selects the filter for a desired frequency range through a multiplexer.

In one known locator, three antennas are used to determine location and depth of underground utilities. A locator housing (not shown) includes three parallel horizontally-aligned antennas (not shown). The bottom antenna (hereafter "C1") is disposed in the housing so that it is parallel to the ground when the operator carries the locator during operation. The second antenna (hereafter "C2") is directly above the first antenna and, being parallel to antenna C1, is also parallel to the ground. The third parallel antenna (hereafter "C3") is directly above antenna C2 in the housing a distance equal to the distance between antennas C1 and C2. The distance between C1 and C3 is referred to herein as "d." The three antennas are connected to amplifier 14 through a multiplexer (not shown) controlled by the CPU.

In operation, the CPU repeatedly samples the signals on the three antennas and relies on the difference in signal strength between C1 and C3 (C1−C3=E1) and between C2 and C3 (C2−C3=E2) to locate an underground utility and determine its depth. In locating an underground utility, the CPU monitors and displays the value of E1, and the operator finds a point above the utility by finding the peak value of E1 in a manner as described above. Once finding such a position, the operator activates a button on the locator to determine the utility's depth, which the CPU calculates according to the function: depth=(d)(E2 )/(E1−(2(E2))).

SUMMARY OF THE INVENTION

The present invention recognizes and addresses the foregoing considerations, and others, of prior art constructions and methods.

Accordingly, it is an object of the present invention to provide an improved system and method for detecting passive signals emitted from underground utilities.

One embodiment of a system for identifying a passive electromagnetic signal emitted from an underground utility includes a portable housing, an antenna disposed within the housing and a control circuit. A frequency bandpass circuit is disposed operatively between the antenna and the control circuit so that the bandpass circuit receives measurement signals from the antenna corresponding to electromagnetic signals received by the antenna and passes to the control circuit a portion of the received measurement signals within a frequency pass band. The control circuit sequentially sets the bandpass filter circuit to a plurality of different frequency pass bands within a measurement frequency range expected to include a frequency of the passive electromagnetic signal. The control circuit receives the measurement signal portion corresponding to each frequency pass band set by the control circuit and selects at least one of the frequency pass bands based on a predetermined criteria applied to the corresponding measurement signal portions.

In an embodiment of a method for identifying a passive electromagnetic signal emitted from an underground utility, a portable above-ground antenna is disposed at a location at which the passive electromagnetic signal is expected. Measurement signals are received from the antenna corresponding to electromagnetic signals received by the antenna. The measurement signals are measured at a plurality of different frequency bands within a measurement frequency range expected to include a frequency of the passive electromagnetic signal, and at least one of the plurality of frequency bands is selected based on a predetermined criteria applied to the measurements.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
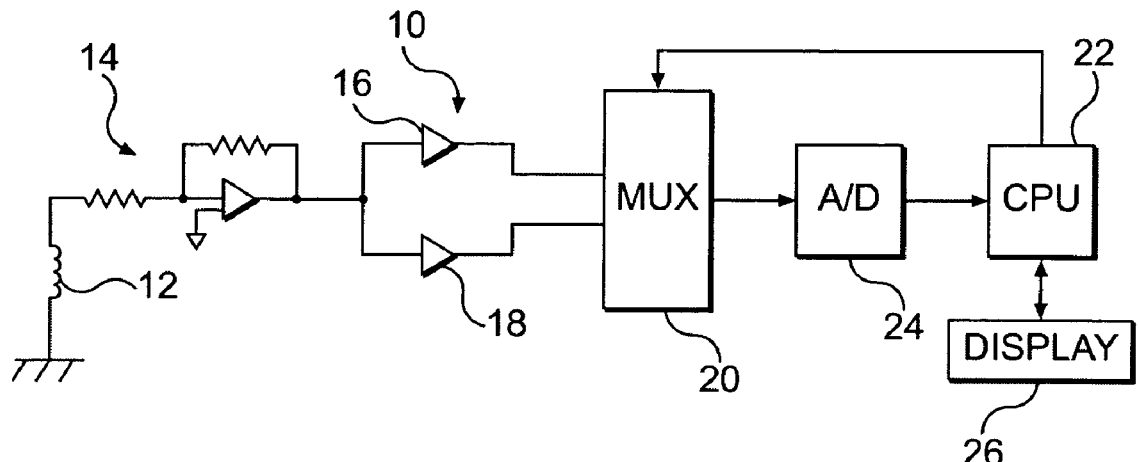
FIG. 1 is a schematic illustration of a prior art above-ground portable utility locator.

Repeat use of reference characters in the present specification and drawings is intended to represent same or analogous features or elements of the invention.

DETAILED DESCRIPTION OF REFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2A:
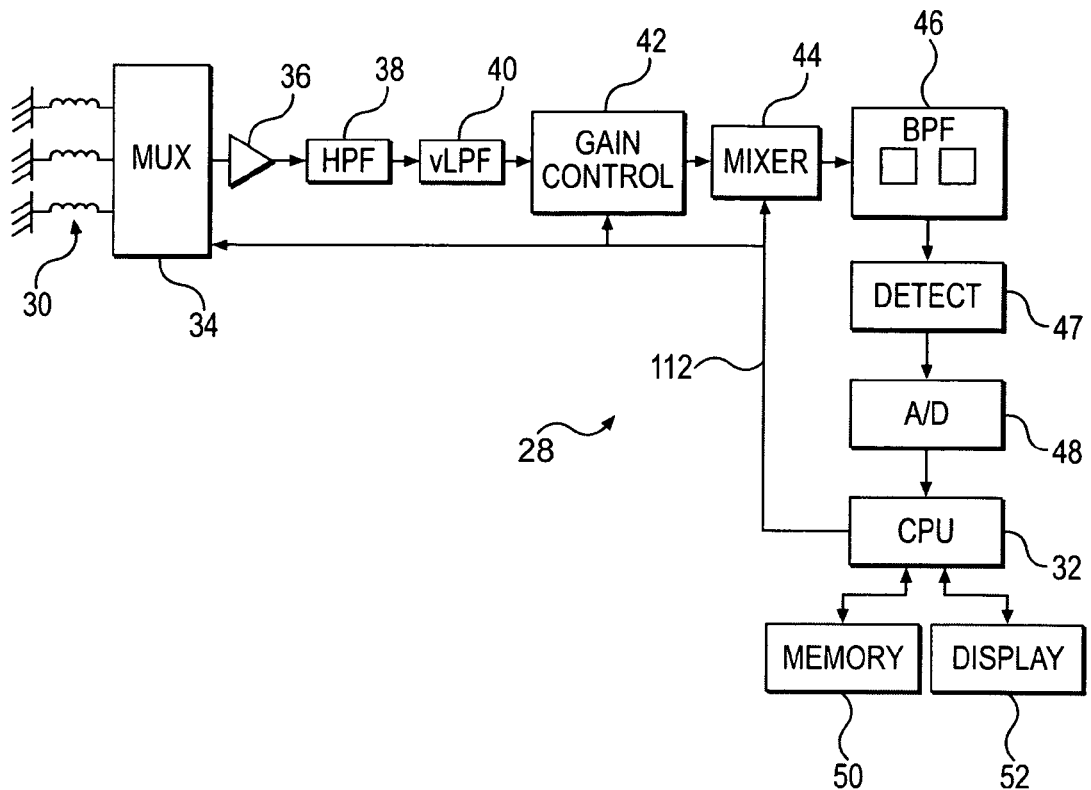
FIG. 2A is a schematic illustration of an above-ground portable locator in accordance with an embodiment of the present invention.
Figure 2B:
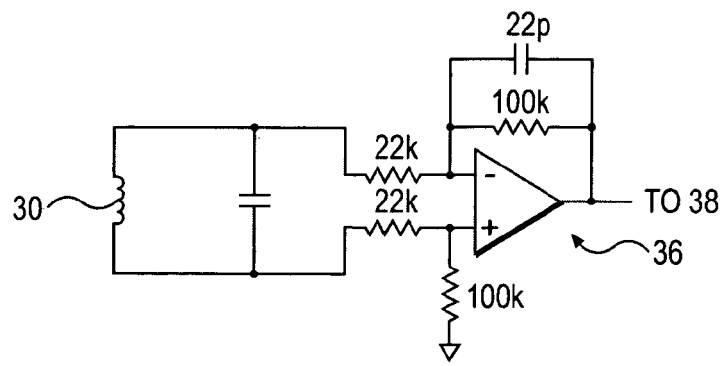
FIG. 2B is a diagrammatic illustration of a part of the schematic illustration of FIG. 2A.
Figure 3:
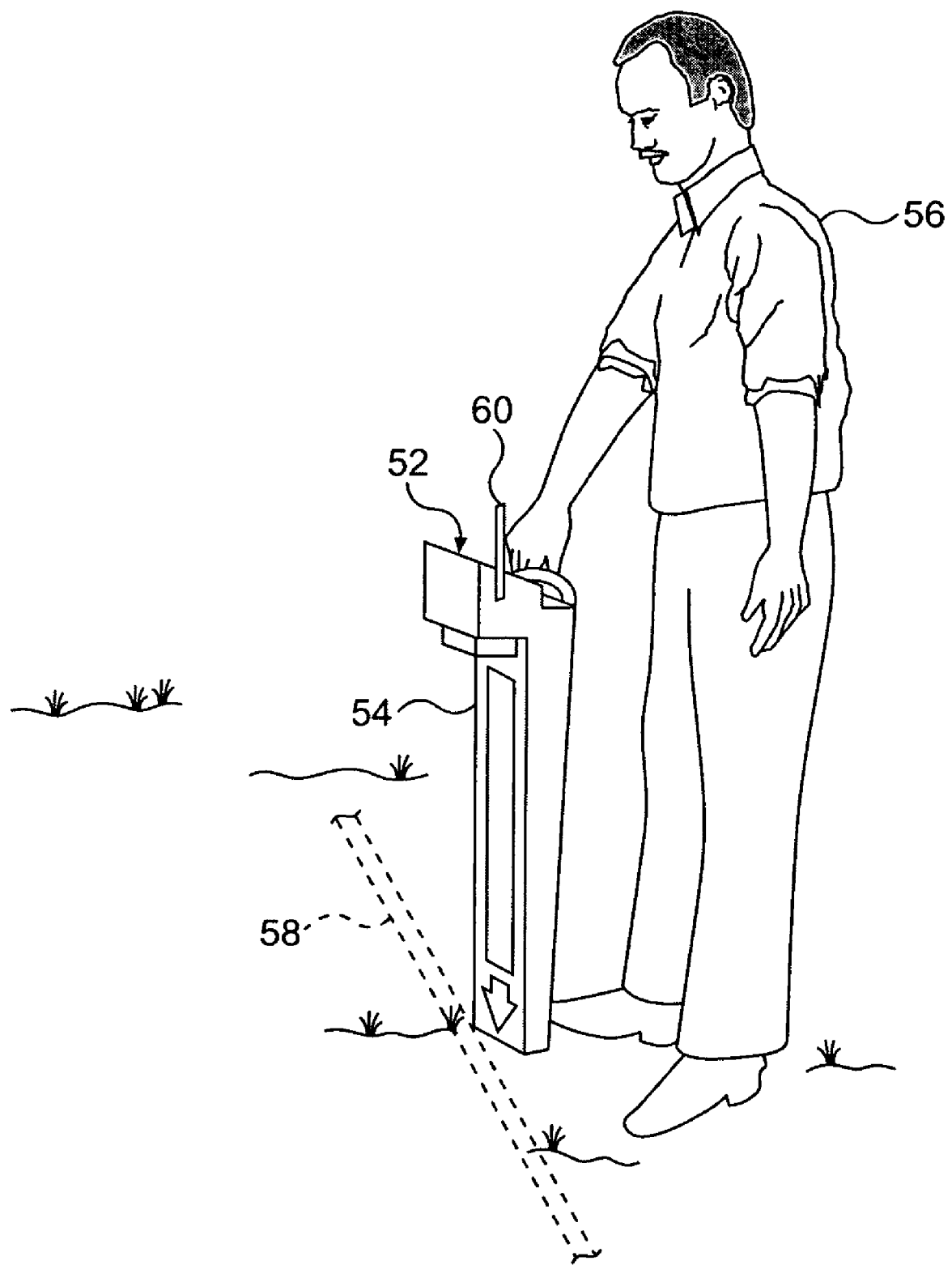
FIG. 3 is a perspective view of an operator and an above-ground locator in accordance with an embodiment of the present invention.

FIG. 2A schematically illustrates an above-ground locator configuration for detecting radio frequency passive signals within a range of 9.6 kHz to 33.2 kHz. A locator 28 includes three coil antennas 30 selected by a CPU 32 through a multiplexer 34. Although it should be understood that any suitable antenna may be used, each antenna 30 comprises a coil extending about a ferrite core. A first antenna 30 is disposed within the lower end of the housing of a locator 54 (FIG. 3) so that as the operator holds the locator in the vertical orientation shown in FIG. 3, first antenna 30 is parallel to the ground. Second and third antennas 30 are disposed in the housing above and parallel to the first antenna in the manner described above. A magnetic field emitted by an underground utility induces measurement signals in antennas 30 that are amplified by an amplifier 36. FIG. 2B provides a circuit illustration of an antenna 30 and amplifier 36. only one antenna 30 is illustrated in FIG. 2B, and multiplexer 34 is omitted.

Figure 2C:
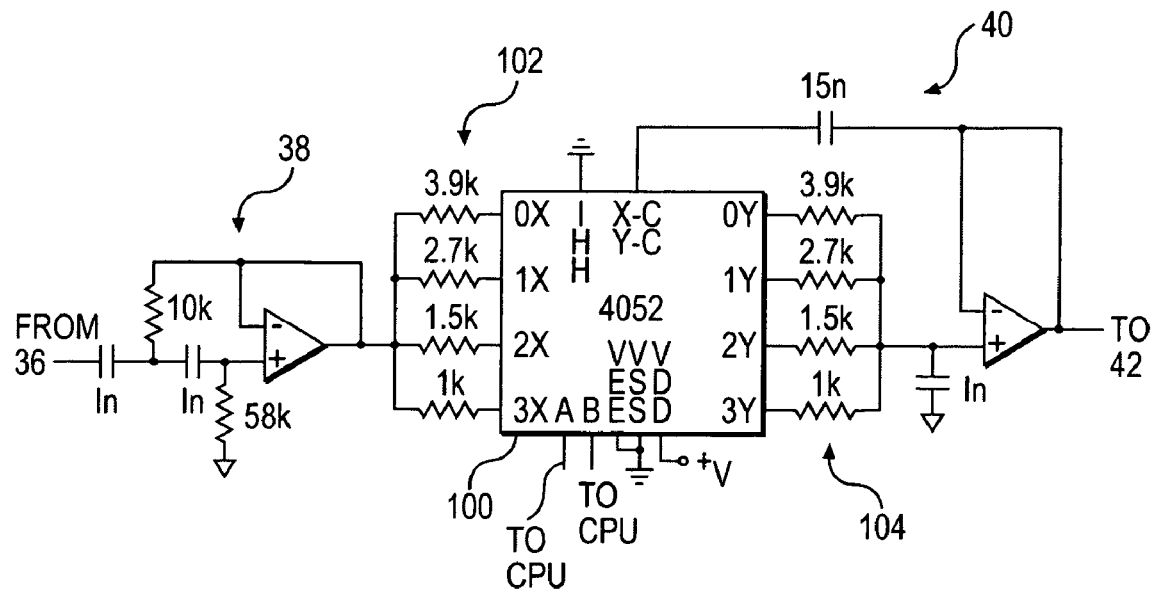
FIG. 2C is a diagrammatic illustration of a part of the schematic illustration of FIG. 2A.

As noted above, the arrangement illustrated in FIG. 2A is configured to locate passive signals within a range of 9.6 kHz to 33.2 kHz. Thus, amplifier 36 outputs to a 9.5 kHz high pass filter 38. CPU 32 controls a variable low pass filter 40 which follows filter 38, to frequency thresholds of 12 kHz, 18 kHz, 25 kHz and 33 kHz. As described in more detail below, the CPU scans signals received by the antennas in frequency steps over the 9.6–33.2 kHz range. As the CPU scans through this range, it steps filter 40 through the four threshold levels to eliminate or reduce false signals caused by higher-order harmonics within the scanning filters. FIG. 2C provides a circuit illustration of filters 38 and 40. Filter 40 includes a multiplexer 100 controlled by the CPU to select a combination of input resistors 102 and output resistors 104 to establish the desired frequency threshold.

Figure 2D:
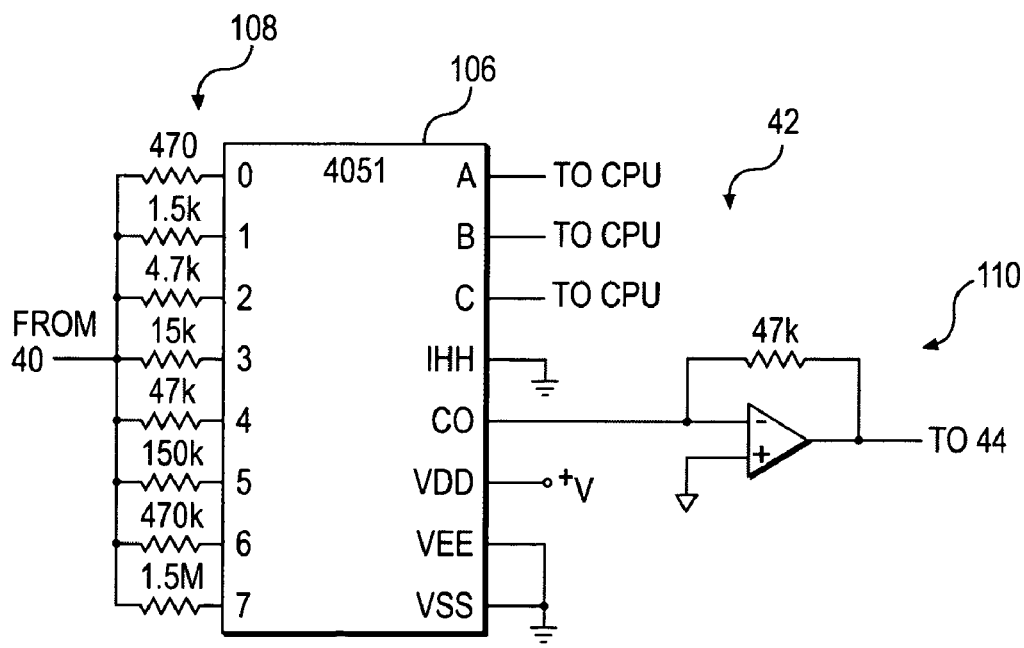
FIG. 2D is a diagrammatic illustration of a part of the schematic illustration of FIG. 2A.

Referring to FIGS. 2A and 2D, low pass filter 40 outputs to a gain control 42 that includes a multiplexer 106, a series of resistors 108 and an op amp/resistor pair 110. As should be understood in this art, each resistor 108 defines a different resistance, for example ranging from approximately 470 ohms to 1.5 Mohms. As described in more detail below, CPU 32 controls multiplexer 106 through control lines 112 to select a desired input resistance 108 to op amp/resistor pair 110, thereby creating a desired amplification.

Figure 2E:
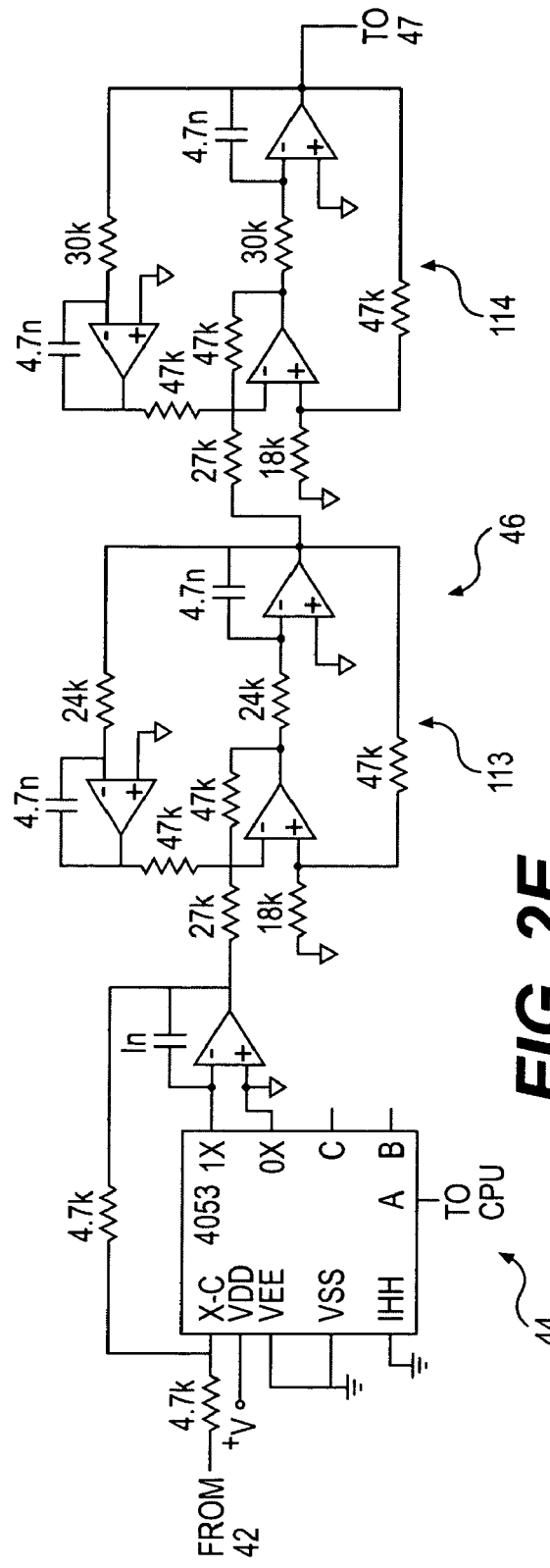
FIG. 2E is a diagrammatic illustration of a part of the schematic illustration of FIG. 2A.
Figure 2F:
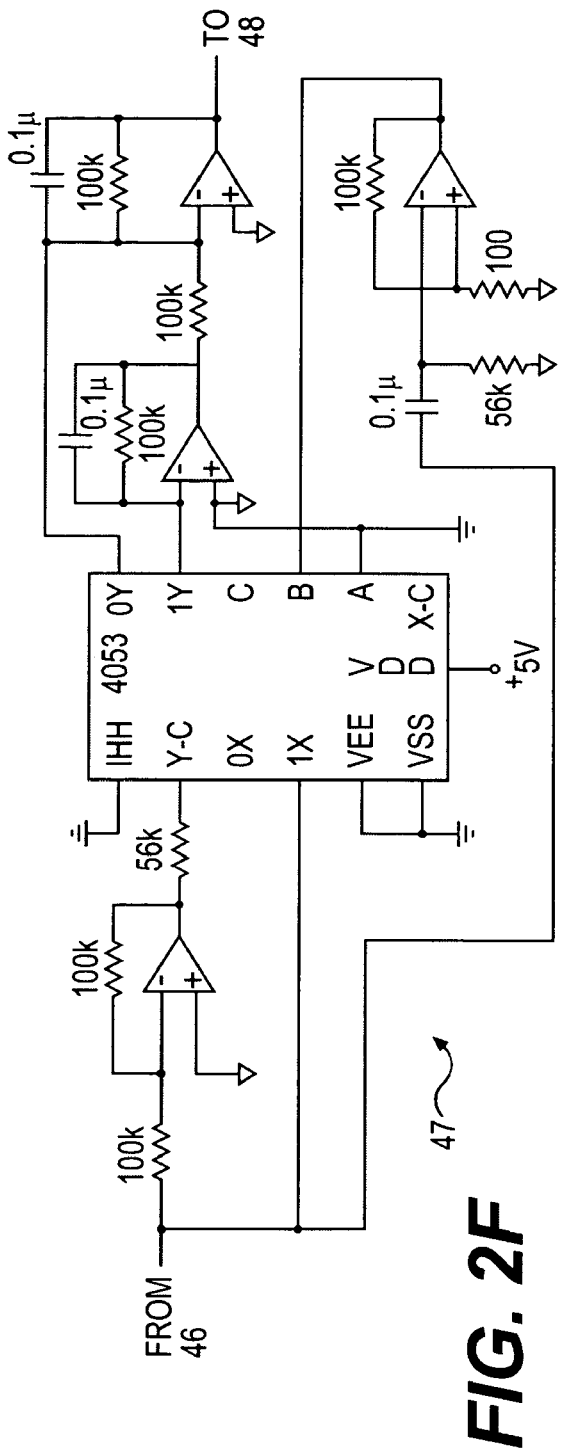
FIG. 2F is a diagrammatic illustration of a part of the schematic illustration of FIG. 2A.
Figure 8:
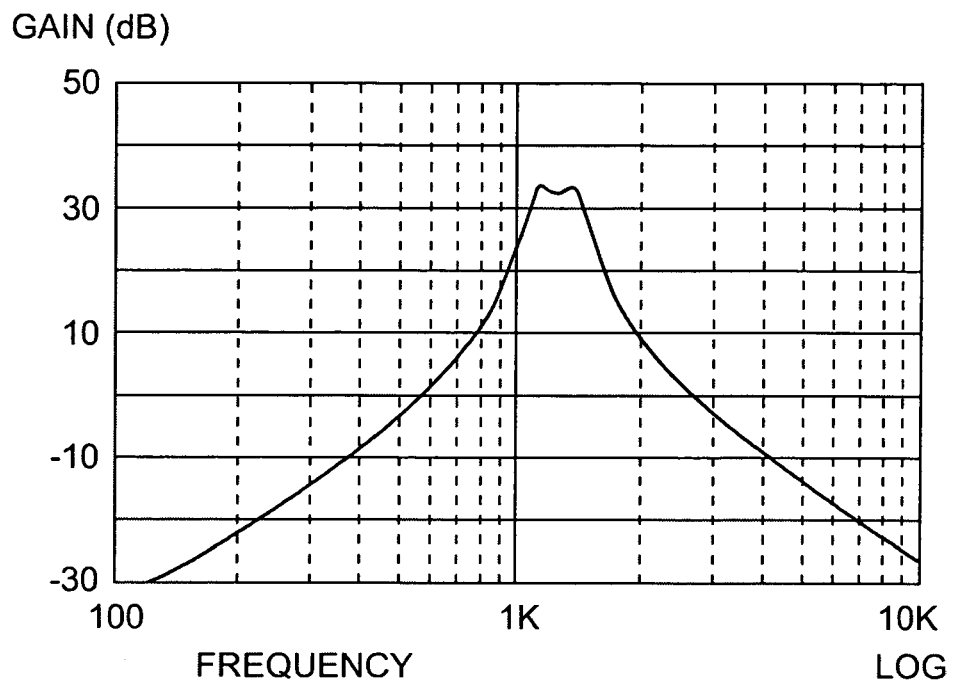
FIG. 8 is a pass band diagram of the filter stages shown in FIG. 2E.

Referring to FIGS. 2A and 2E, the now-amplified signals are output from the automatic gain control to a mixer circuit 44 and a bandpass filter 46. Together, mixer 44 and bandpass filter 46 comprise a selectable bandpass filter. Mixer 44 mixes a clock signal from CPU 32 with the measurement signal from the gain control so that the signal output from the mixer has a frequency equal to the difference between the clock signal frequency and the measurement signal frequency. Bandpass filter 46 includes a pair of filter stages 113 and 114 that pass a frequency range of approximately 1.1 kHz to 1.5 kHz, as indicated in FIG. 8. As described below, the CPU controls mixer 44 to cycle the overall variable bandpass filter formed by mixer 44 and filter 46 through frequency bands within a predetermined measurement frequency range in order to find a passive signal emitted from an underground utility of interest, despite the presence of competing background signals. Referring also to FIG. 2F, bandpass filter 46 outputs the signal to a detection circuit 47. Detection Circuit 47 AC-couples the signal prior to input to an analog-to-digital converter 48, which passes a digitized signal to CPU 32. The CPU communicates with a memory 50, which may be wholly or partly maintained within the CPU, to store and retrieve signal values. A display 52 assists the user in finding the desired signal.

The CPU steps the clock frequency through predetermined levels (from 10.8 kHz to 34.4 kHz) so that the overall variable bandpass filter formed by mixer 44 and filter 40 consecutively steps through the measurement frequency range (9.6 kHz–33.2 kHz in the present example) at 0.4 kHz increments. For example, assume the operator stands above an underground utility that emits a passive signal at 9.6 kHz, disposes antennas 30 so that the antennas are perpendicular to the utility line, and activates the CPU to measure the strength of the signals received by the antennas. The CPU initially sets the frequency threshold of low pass filter 40 to 12 kHz. Due to high pass filter 88 and low pass filter 40, therefore, the mixer receives a measurement signal ranging in frequency from 9.5 kHz to 12 kHz. Since the utility is emitting a passive signal at 9.6 kHz, the measurement signal contains the peak signal.

The CPU also initially sets the clock signal to 10.8 kHz. As noted above, the signal output by the Mixer has a frequency equal to the difference between the clock signal frequency and the measurement signal frequency. Thus, when mixer 44 mixes the measurement signal with the clock signal, the signal output from the mixer has a frequency range of −1.2 kHz (i.e. a 1.2 kHz signal with opposite phase) to 1.3 kHz. Since the peak signal is at 9.6 kHz, the peak in the mixed signal is located approximately at 1.2 kHz, which is within the 1.1–1.5 kHz pass band of bandpass filter 46. That is, the 1.1–1.5 kHz pass band of filter 46 corresponds to a pass band of 9.3–9.7 kHz (limited by 9.5 kHz filter 88) in terms of the measurement signal frequencies, and this includes the peak signal at 9.6 kHz. Being the first measurement, the CPU stores and displays the signal strength and the approximate center frequency of the pass band in which the signal was detected, i.e. the clock frequency step (10.8 kHz) minus 1.2 kHz, or 9.6 kHz.

CPU 32 maintains this frequency band for about 0.5 seconds and then increases the clock frequency by 0.4 kHz, to 11.2 kHz. The variable low pass filter remains at 12 kHz. The mixer again receives a measurement signal having a range of 9.5 kHz to 12 kHz. Again, this signal includes the strong portion at 9.6 kHz. The mixer, however, changes the measurement signal's frequency to a range from −0.8 to 1.7 kHz. The signal peak is at 1.6 kHz (i.e. 11.2 kHz−9.6 kHz) and is, therefore, slightly beyond the filter's peak pass band of 1.1–1.5 kHz. In other words, the overall filter's peak pass band now ranges from 9.7 kHz to 10.1 kHz, which excludes the signal peak. The CPU compares the new signal strength with the previously stored signal strength. Since the new measurement is weaker, the CPU does not store the new signal strength or its measurement frequency.

The CPU increases the clock frequency by 0.4 kHz, to 11.6 kHz. At this step, the bandpass filter passes the measurement signal corresponding to the frequency range 10.1–10.5 kHz. Thus, the peak signal is again outside the pass band. The signal strength measured by the CPU is less than the stored value, and the CPU therefore maintains the previously stored signal strength and measurement signal frequency values in memory 50.

The CPU then consecutively increases the clock frequency, intermittently increasing the threshold level of low pass filter 40, as described in more detail below, to accommodate the increase in frequency range, and measures the signal strength at each step. Since each step moves the filter pass band farther from the 9.6 kHz peak value, the CPU maintains the signal values stored at the 10.8 kHz clock frequency step. Upon completely scanning the measurement frequency range, the CPU causes display 52 to display the approximate center frequency (9.6 kHz) of the measurement signal frequency range (9.3 kHz to 9.7 kHz) at which the peak signal was found.

Figure 9:
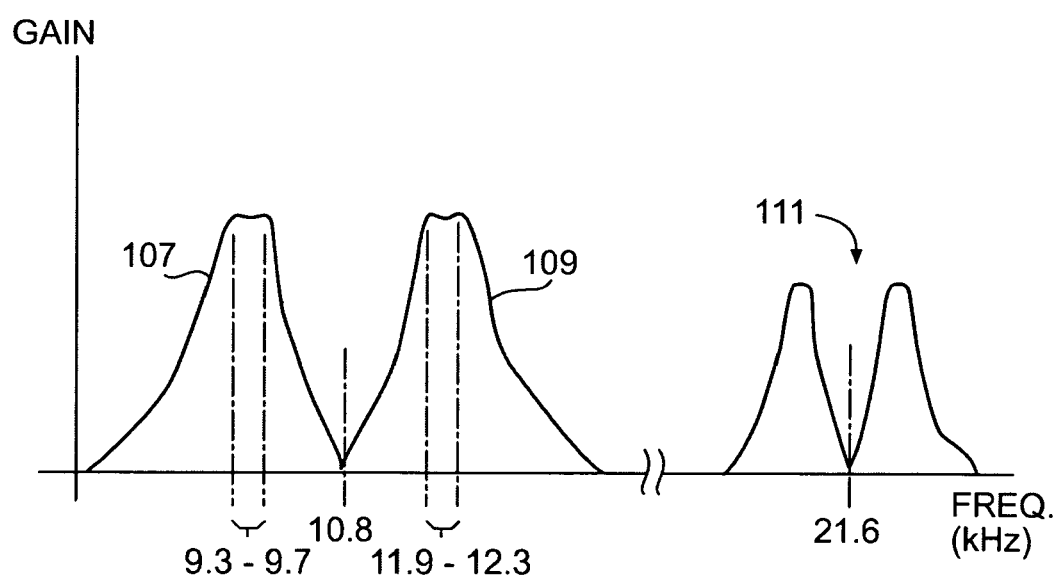
FIG. 9 is an exemplary pass diagram for a filter in accordance with an embodiment of the present invention.

FIG. 9 illustrates the pass bands defined by the overall filter comprised of mixer 44 and bandpass filter 46 (FIG. 2A) when the clock frequency is 10.8 kHz. As discussed above, a pass range 107 has a peak between 9.3 kHz and 9.7 kHz. As should be understood in this art, however, the filter also defines a pass band 109 having a peak between 11.9 kHz and 12.3 kHz. Accordingly, when the clock frequency is 10.8 kHz, the filter passes peak signals to detector 47 both in the 9.3–9.7 kHz range and the 11.9–12.0 kHz range. Thus, the CPU detects a peak signal and stores the received signal strength in association with the center frequency (9.6 kHz) of pass range 107, whether the peak occurs in range 107 or range 109. Low pass filter 40 may, however, limit the existence of signals within range 109.

Because the system correctly records the peak signal when the peak later appears in pass band 107, the apparent uncertainty regarding the center frequency is resolved as the clock frequency steps up through the operative range. Assume, for example, that the utility emits a signal at 11.9 kHz. The signal peak passes through low pass filter 40, which has a pass band at this step of 12 kHz, and the CPU stores the detected signal's strength in association with the 9.6 kHz pass frequency, i.e. in association with incorrect pass band. But when the clock frequency steps to 13.2 kHz, pass band 107 has a peak range from 11.7 kHz to 12.1 kHz, and the detector therefore again detects the signal emitted by the utility. Since the signal strength is equal to or greater than the stored signal strength, the CPU stores the newly-detected signal strength in association with the correct frequency, i.e. 12.0 kHz.

The overall filter also defines a harmonic set of pass bands 111 centered at 21.6 kHz when the filter clock frequency is at 10.8 kHz. Low pass filter 40, however, the threshold of which is set to 12 kHz, removes any signals received by the antennas that would otherwise be detected in this pass range. Thus, the system does not improperly respond to this or other higher order harmonics.

As the CPU steps the filter up through the operative frequency range, it intermittently changes the threshold level of filter 40. In the presently-described embodiment, the CPU sets the low pass filter threshold with respect to the clock frequency as described in the following table:

TABLE 1

| Clock Frequency | LP Filter Threshold Frequency |
| --- | --- |
| <12 kHz | 12 kHz |
| >=12 kHz and <18 kHz | 18 kHz |
| >=18 kHz and <25 kHz | 25 kHz |
| >=25 kHz | 33 kHz |

It should be noted that at the clock frequency's last step, i.e. 34.4 kHz, the pass range of pass band 107 is 32.9–33.3 kHz. At this point, filter 40 is set to 33 kHz. Thus, the detector sees only signals in the early portion of pass band 107 (32.9–33.0 kHz) and does not see signals within pass band 109.

As noted above, CPU 32 also controls automatic gain control circuit 42 through control lines 112. More specifically, and referring to FIGS. 2A and 2D, CPU 32 controls multiplexer 106 at the beginning of the frequency scan, procedure to select a resistor 108 providing the highest gain. That is, at the beginning of the scan, gain is at a maximum. As should be understood in this art, however, it is possible that the A/D converter may "clip" signals above or below the component's operative range. Accordingly, the CPU compares the intensity levels of incoming signals to predetermined maximum and, optionally, minimum thresholds within the A/D converter's operative range. The particular threshold settings within the operative range may vary, for example, with the particular component used in the system. If signal intensity reaches the maximum threshold, the CPU switches multiplexer 106 to select another resistor option so that gain is reduced by a factor of ten. If the signal reaches the minimum threshold, the CPU does not increase the gain. As illustrated below, automatic control is unnecessary for low signals in the described embodiment. The CPU monitors intensity levels in this manner throughout scanning of the measurement frequency range.

Figure 7:
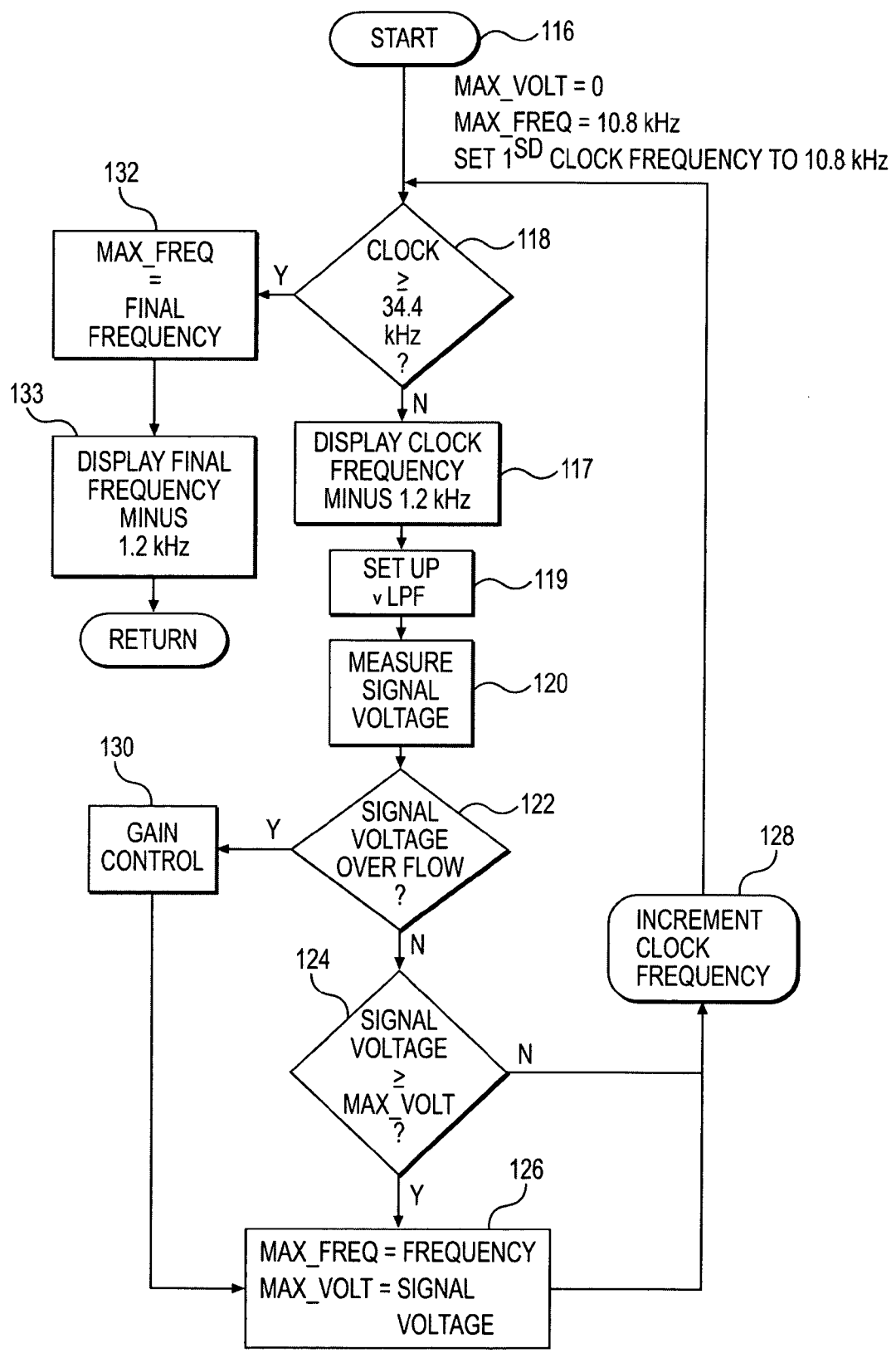
FIG. 7 is a flow chart illustrating operation of an above-ground locator in accordance with an embodiment of the present invention.

FIG. 7 illustrates operation of the exemplary scan procedure described above. When the operator initiates the procedure at 116, the CPU sets the initial stored signal voltage level to zero, sets the initial clock frequency at 10.8 kHz and sets the initial center measurement frequency to 9.6 kHz. As indicated in the flow chart, the CPU does not directly store the 9.6 kHz frequency. Instead, a MAX_FREQ variable, which corresponds to the frequency at which the high signal intensity is detected, is initially set to 10.8 kHz. Since the locator displays are offset by −1.2 kHz, however, 10.8 kHz setting corresponds to 9.6 kHz, and the CPU is considered to have "stored" the 9.6 kHz level. At 118, the CPU determines whether the clock frequency is greater than 34.4 kHz, i.e. the maximum clock frequency covering the scan's last operative measurement signal frequency range of 9.6 kHz to 33.2 kHz. If not, the routine has not yet reached the end of the scan, and the CPU displays the measurement frequency (i.e. the clock frequency less 1.2 kHz) on locator display 52 (FIG. 2A) at 117 and sets low pass filter 40 (FIG. 2A) at 119 to its threshold as defined by Table 1 above.

At 120, the CPU measures the signal voltages on each of the three receiver coils. As described above, the three locator coils (C1, C2 and C3) are parallel and vertically aligned in the locator housing. The CPU adds the signal voltages measured on the bottom and top coils (i.e. C1+C3) and considers this value to be the measured signal voltage.

At 122, the CPU compares the measured signal voltage to the maximum voltage threshold corresponding to the analog-to-digital converter overflow. If the signal is below the threshold maximum, the CPU compares the measured signal voltage to the previously stored measured signal voltage (MAX_VOLT) at 124. If the measured signal voltage is greater than or equal to MAX_VOLT, the CPU stores at 126 the measured signal voltage as MAX_VOLT and stores the center frequency of the measurement signal frequency range at which the measured signal voltage was found. As described above, the CPU stores the measurement frequency through setting MAX_FREQ to the clock frequency at which the signal was detected. The CPU increments the clock frequency at 128 and returns to 118 for the next measurement. If the measure signal voltage is less than MAX_VOLT at 124, the CPU increments the clock frequency at 128 without changing MAX_VOLT.

If the measured signal voltage overflows the voltage threshold at 122, the CPU automatically reduces the gain by a factor of ten (as discussed above) at 130. Since this occurrence necessarily means the measured signal voltage is greater than the previously stored voltage level, there is no need for a comparison, and the CPU stores the measured signal voltage and corresponding center frequency at 126.

When the clock frequency incremented at 128, exceeds 34.4 kHz at 118, the last-stored center frequency is considered the frequency at which the peak signal was found, and the CPU therefore stores this final frequency at 132 (again, through storage of the clock frequency, which is understood to be 1.2 kHz offset from the measurement frequency), displays the final frequency at 133 and ends the frequency scan routine.

As discussed above, the pass range of pass band 107 (FIG. 9) is 32.9–33.3 kHz when the clock frequency is 34.4 kHz. Since low pass filter 40 is set to 33 kHz at that time, however, pass band 107 only detects signals from 32.9 kHz to 33.0 kHz. In an alternate embodiment, step 118 checks whether the clock frequency is greater than or equal to 34.4 kHz. Thus, the maximum clock frequency is 34.0 kHz, not 34.4 kHz. The last operative pass band is 32.5 kHz to 32.9 kHz, and the last center frequency is 32.8 kHz rather than 33.2 kHz.

It should be understood that the schematic and circuit illustrations in FIGS. 2A through 2F, and the procedural illustration in FIG. 7, are provided for purposes of example only. Thus, for example, it should be understood that various circuit configurations, frequency step dimensions and measurement frequency ranges may be used. Furthermore, as noted above, the present locator may be used to locate underground utilities emitting signals at active frequencies and at frequencies other than within the presently-described radio frequency band. For example, the locator may also be used to locate passive signals at 50–60 Hz for power lines, 110–120 Hz for gas lines, and 512 Hz for fault location. Accordingly, and referring to FIG. 2A, locator 28 includes three additional band pass filter circuits (not shown), each defining a pass band encompassing a respective one of these three desired frequency levels. The three filter circuits are disposed in parallel with each other and with the series filters 38 and 40. When the operator selects a desired frequency level as described below, the CPU automatically selects the corresponding one of the three parallel filter circuits through a multiplexer controlled by CPU 32.

The locator may be used to locate utilities emitting signals resulting from signals actively placed on the utility by the operator through direct connection to the utility or through a probe passed through the utility, as described in U.S. Pat. No. 6,102,136. In one presently preferred embodiment, these signals are generated at frequencies of 512 Hz, 9.5 kHz and 38 kHz. As noted above, a parallel band pass filter is provided for 512 Hz signals. When the operator selects the 9.5 kHz and 38 kHz frequencies, however, the multiplexer selects the path of filters 38 and 40. When detecting 38 kHz signals, filter 40 is set to a level above 38 kHz.

Similarly, the locator includes four additional bandpass filter circuits (not shown) in parallel with bandpass filter 46 to accommodate location of signals at the 50–60 Hz, 100–120 Hz, 512 Hz and 9.5 kHz/38 kHz ranges. Although a separate band pass filter is provided for the 9.5 kHz and 38 kHz signals, it should be understood that band pass filter 46 may instead be used for these frequencies. When the operator selects a desired frequency level, the CPU automatically selects the corresponding one of the four parallel bandpass filter circuits through a multiplexer controlled by the CPU.

When the locator is not executing an automatic frequency scan, the system operator may manually control the gain through an input interface provided as part of display 52. CPU 32 drives an indicator on display 52 that describes the magnitude of incoming signals as a percentage relationship to benchmark gain setting. Upon activation of a "Gain" button on display 52, the CPU determines whether the signal level from the A/D converter is at or above the converter's maximum threshold value. If so, gain is reduced by a factor of ten as described above. The resulting high (1) and low (0) levels of signals from the converter become the new benchmark levels, and the indicator at display 52 is re-set so that signals at these levels are displayed as a "70%" power level. The percentage power level displayed for any subsequent signal is determined relative to the 70% benchmark signal. Thus, a reading of 100% may indicate that the incoming signal might be too large, and the operator may therefore choose to again activate the Gain button. Additionally, the system provides an indicator on the display whenever the signal level from the converter is at or above the converter's maximum value that prompts the operator to activate the Gain button.

If, when the operator activates the Gain button, the signal level from the A/D converter is below the converter's maximum value, the high and low signal levels from the converter become the new 70% benchmark levels, but the system does not change the gain.

As described above, and referring to FIG. 3, a system according to the present invention may be used as part of an above-ground locator 54 carried by an operator 56. The bottom-most antenna 30 (FIG. 2) is disposed at the bottom of locator 54 so that it is proximate the ground, and the second and third antennas are above and parallel to the first antenna. Display 52 is provided on an upper surface of locator 54 so that it is easily viewed by the operator during the process of locating an underground utility 58. Upon finding the utility, the operator may record the utility's location to avoid later collisions with the utility by an underground boring tool.

Figure 4:
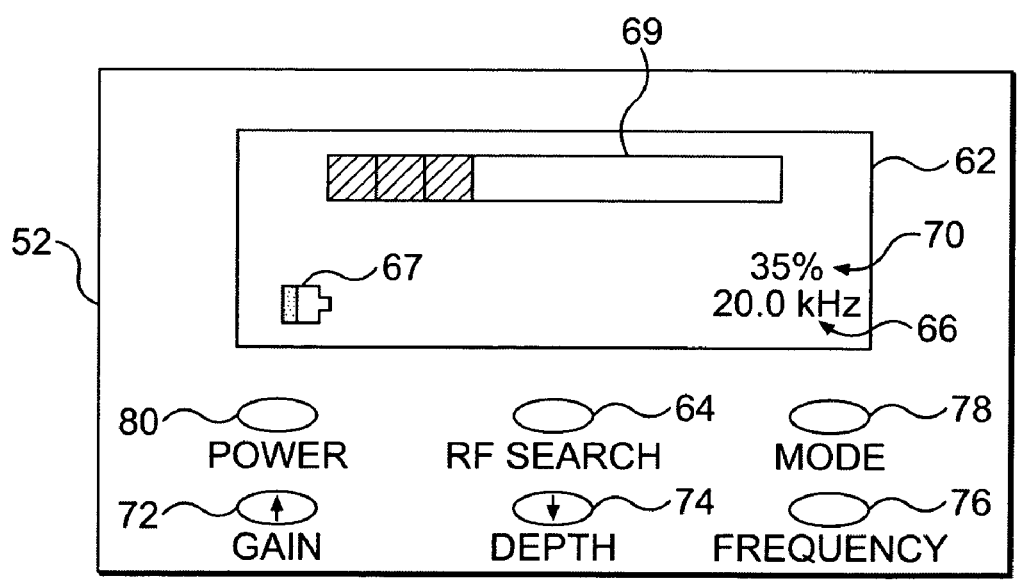
FIG. 4 is a schematic illustration of a locator display in accordance with an embodiment of the present invention.

Referring to FIGS. 2 and 4, display 52 may be presented in any suitable fashion to the operator, for example by way of an LED display. In the example provided in FIG. 4, a touch pad area is provided having a series of six buttons that can be activated by the operator to place the locator in a desired mode of operation and to execute certain functions within one or more given modes. A display screen area 62 may change from mode-to-mode to display information relating to the selected mode. The various operating modes are described below.

A "Power" button 80 activates the locator. The locator may be provided with a speaker to permit the system to issue audible alarms and to backlight the display screen. Accordingly, when the operator activates a "Mode" button 78, display 52 provides a screen (not shown) at 62 that provides sound and backlight options. From this screen, multiple activations of a "Gain" button 72 cycles the device through various sound level options, while a "Depth" button 74 cycles the device through backlight options.

Activation of Mode button 78 a second time allows the operator to put the locator in a "probe" mode, in which the locator is configured to receive signals emitted from a probe moved through the underground utility. In the present embodiment, the probe may emit signals at 38 kHz, although it should be understood that the particular frequency used may vary. The operator may put the receiver in or out of probe mode by activating a "Frequency" button 76. Activating the probe mode selects an appropriate band pass filter (not shown) in parallel with filter 46, as described above. The CPU selects filters 38 and 40, with low pass filter 40 being set to an appropriate level. Activation of the "Mode" button a third time returns the locator to location functions and the receiver is set to operate at 38 kHz.

The operator may also turn probe mode off and then re-activate the Mode button. At this point, or following power-up without going into probe mode, "Frequency" button 76 allows the operator to set the receiver for non-probe reception of signals at five predetermined frequency levels. Three frequency levels are used with signals directly or indirectly placed on the underground utility by an above-ground transmitter. In direct modes, the transmitter places a location signal on the utility through a cable that attaches to the utility or to a conduit encasing the utility. In the presently described embodiment, the signal is either a combination of 9.5 kHz and 38 kHz or a combination of 512 Hz and 9.5 kHz. Generally, 9.5 kHz is preferred for locating cables in areas congested with existing utilities and for power cables and tracer wires, while 38 kHz signal is preferred for CATV lines and metal pipes and cables. Thus, in such conditions, the transmitter applies the 9.5/38 kHz signal in direct connection or external connection mode, and the operator sets the locator to receive at 9.5 kHz or 38 kHz, as appropriate. The 9.5 kHz/512 Hz signal may be used for cable location but is preferred to detect faults. In the induction mode, the transmitter is placed on the ground above the utility and emits an electromagnetic field that induces a signal on the utility at 38 kHz. Additionally, the locator may be set to locate signals at 50–60 Hz (power frequencies) and 110–120 Hz (gas line signals).

Figure 5:
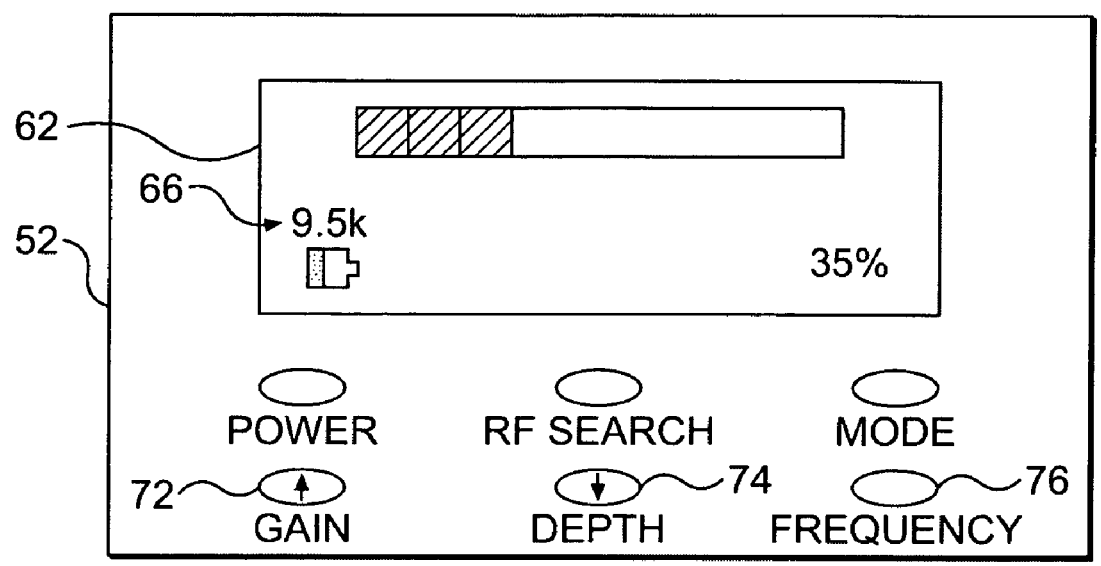
FIG. 5 is a schematic illustration of a locator display in accordance with an embodiment of the present invention.

Each of these five frequency positions (9.5 kHz, 38 kHz, 50–60 Hz, 110–120 Hz, and 512 Hz) is stored by the system CPU and memory, and the Frequency button allows the operator to cycle through the frequency options to select a desired range. Upon activating Frequency button 76, and referring to FIG. 5, screen 62 displays at 66 the last frequency band used in this mode. If, for example, the operator had last used the locator to find natural gas lines, indicator 66 presents "120" to indicate that the locator's last setting was 110–120 Hz. If the operator wishes to again search for a gas line, he activates Frequency button 76 a second time, thereby causing CPU 32 (FIG. 2A) to select the appropriate band pass filter in parallel with filters 38 and 40 (FIG. 2A) and the appropriate band pass filter in parallel with band pass filter 46 (FIG. 2A). If, however, the operator wishes to move the locator from the 120 Hz mode to 38 kHz, he activates button 76 two additional times to move CPU 42 through the 512 Hz setting to the 38 kHz position. Generally, regardless of the initial frequency setting, the operator activates button 76 to move through the frequency settings (9.5 kHz, 38 kHz, 50–60 Hz, 110–120 Hz, 512 Hz) to a desired frequency range.

Generally, the operator sets the receiver to one of these frequency settings in order to locate and determine the depth of a utility line that is emitting signals at the known frequency. Then, the operator searches for and locates the utility as described above.

Note that the operator may set the locator to 38 kHz reception either in probe mode or in cable location mode. While the receiver's filter settings are the same in the two modes for this frequency, the depth calculations are different.

Referring again to FIG. 4, an RF Search button 64 sets the locator to a search mode for passive frequencies. As described above, the present embodiment searches for passive frequencies within an operative range of 9.6 kHz to 33.2 kHz, although larger, smaller and/or different ranges could be used as desired. Again, and referring also to FIG. 2A, system memory 50 retains the last frequency level at which the system was set in this mode. Thus, upon activation of the RF Search button, CPU 42 sets the mixer to locate that frequency, which is displayed as a blinking number at 66. Remaining battery life is indicated at 67. At this point, the CPU measures signals received at the indicated frequency and provides the intensity level of those signals at a bar graph 69 and numerically at 70. The bar graph is a percent of the "maximum" magnitude level as described above.

If the frequency level of passive signals from the desired utility is known, or if the operator desires to manually search for the frequency level, the operator may manually change the CPU's frequency setting though "up" button 72 and "down" button 74. Each button activation moves the frequency displayed at 66 up or down 0.4 kHz, depending on which button is pushed. If the operator is moving the receiver to a known frequency level, the operator again activates RF Search button 64 upon reaching that level, thereby causing CPU 42 to set the bandpass filter to the desired frequency band. Frequency indicator 66 stops blinking, and the operator proceeds with utility measurements. If the operator does not know, or is not confident of, a utility's passive frequency level, the operator may step through several frequency levels using this manual method until finding a peak signal.

Alternatively, the operator may execute an automatic frequency scan as discussed above. After initially activating the RF Search button, so that frequency indicator 66 blinks, the operator starts an automatic scan by activating either of up or down buttons 72 and 74. If the operator presses up button 72, CPU 42 starts at the bottom of the operative frequency range (9.6 kHz in the present example) and samples upward in 0.4 kHz steps to the top of the range (33.2 kHz in the present example). If the down arrow is pressed, the CPU starts at the top of the frequency range and moves down. When searching down through the operative range, the measurement frequency is considered to be 1.2 kHz above the clock frequency, and the CPU displays the measurement frequency (clock frequency plus 1.2 kHz), at steps 117 and 133 (FIG. 7). That is, and referring also to FIG. 9, pass band 109 is the measurement band, as opposed to pass band 107, when scanning downward.

While a 0.4 kHz frequency step is provided as an example, it should be understood that different step sizes may be used as desired. The frequency step size may depend, for example, upon the performance level of the CPU, for example a Hitachi HD64F3644H microprocessor operating at a 7.37280 MHz base clock. As should be understood in this art, increasing clock frequency and/or CPU efficiency may permit smaller step size, for example 0.3 kHz or 0.1 kHz.

As the CPU scans the frequency range in the automatic scan mode, frequency indicator 66 continues to blink. Bar graph 68 and numerical indicator 70 show the signal intensity currently stored as the strongest signal received by the system, and frequency indicator 66 blinks at the corresponding frequency. Thus, these indications change as the system finds stronger signals. Because smaller peak levels may indicate the presence of other underground cables in the area, the operator may note the frequencies at which such smaller peaks occur for later attempts to locate the other cables.

When the system finds the peak level, CPU 42 has stored the frequency level in memory 50. Indicator 66 stops blinking, thereby notifying the operator that the automatic scan is complete. Bar graph 68 and numerical indicator 70 show the signal intensity at the selected frequency, and the operator proceeds with utility measurements.

If an operator presses button 72 before actuation of another mode button, button 72 acts as a "Gain" button by which the operator sets the signal gain to 70% as described above.

If an operator presses button 74 before actuation of another mode button, button 74 acts as a "Depth" button by which the operator may use the locator to find the depth of the underground utility. The locator's three antennas (FIG. 3) are used to determine location and depth of underground utilities. The bottom antenna (C1) is disposed in the housing so that it is parallel to the ground when the operator carries the locator during operation. The second antenna (C2) is directly above the first antenna and, being parallel to antenna C1, is also parallel to the ground. The third parallel antenna (C3) is directly above antenna C2 in the housing a distance equal to the distance between antennas C1 and C2. The distance between C1 and C3 is referred to herein as "d." Referring also to FIG. 2A, the antennas are connected to downstream amplifiers through multiplexer 34.

Figure 6:
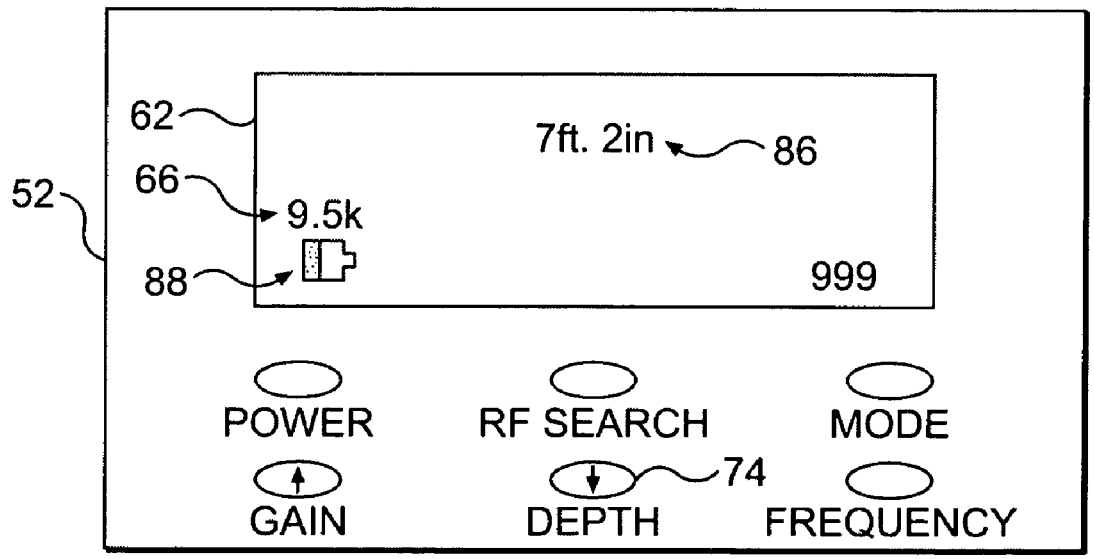
FIG. 6 is a schematic illustration of a locator display in accordance with an embodiment of the present invention.

During the "probe" mode described above, in which the locator is used to locate an underground utility through location of electromagnetic signals emitted from a probe in the utility, the CPU repeatedly samples the signals on the three antennas. The CPU relies on the difference between, and the sum of, the signal strengths on C1 and C3 (C1+C3=E1, C1−C3=E2) to locate an underground utility and determine its depth. In locating an underground utility, the CPU monitors and displays the value of E1, and the operator finds a point above the utility by finding the peak value of E1 in a manner as described above. Alternatively, the locator could display E2 in locating the utility. Once finding such a position, the operator activates button 74 to determine the utility's depth, which the CPU calculates according to the function: depth=(3/2)(d)(E1−E2)/(E2). Referring to FIG. 6, activation of button 74 in this manner provides a screen 62 that displays a depth measurement at 86, the frequency level at 66 and the remaining battery life at 88.

If the locator is set (through activation of "Frequency" button 76 as discussed above with respect to FIG. 5) to locate power lines, gas lines, faults or lines upon which the transmitter has actively placed a signal, E2 is equal to C1−C3, and E3 is equal to C2−C3. In locating an underground utility, the CPU monitors and displays the value of E2, and the operator finds a point above the utility by finding the peak value of E2. Once finding such a position, the operator activates button 74 to determine the utility's depth, which the CPU calculates according to the following function: depth=(d)(E3)/(E2−(2(E3))).

If the locator is set to locate RF signals through the "RF Search" button, the CPU repeatedly samples the signals on the three antennas. E1 is again equal to C1+C3, and E2 is equal to C1−C3. In locating an underground utility, the CPU monitors and displays the value of E1, and the operator finds a point above the utility by finding the peak value of E1. Once finding such a position, the operator activates button 74 to determine the utility's depth, which the CPU calculates according to the following function: depth=(d/2)(E1−E2)/E2=(d)(C3)/(E2).

When locating an underground utility when the locator is set through the "Frequency" button, the operator sets the locator to the desired frequency and walks with the locator in the cross-wise or grid patterns discussed above or other patterns as desired. When locating an underground utility when the locator is set through the "RF Frequency" button, the operator may first place the locator near an above-ground exposure of the utility, or near an above-ground junction box or post to which the utility is connected, and execute either of the manual or automatic frequency searches discussed above to locate the peak frequency at which the utility emits passive RF signals. After activating the "RF Search" button a second time to set the locator to the peak frequency, the operator proceeds to locate the utility in the cross-wise or grid patterns discussed above or other pattern as desired.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed is:

1. A locator for identifying a passive electromagnetic signal emitted from an underground utility, said locator comprising:
   a portable housing;
   an antenna disposed within said housing;
   a control circuit; and
   a frequency bandpass circuit disposed operatively between said antenna and said control circuit so that said bandpass circuit receives measurement signals from said antenna corresponding to electromagnetic signals received by said antenna and passes to said control circuit a portion of said received measurement signals within a frequency pass band,
   wherein said control circuit sequentially sets said bandpass circuit to a plurality of different frequency pass bands within a measurement frequency range expected to include a frequency of said passive electromagnetic signal, receives said measurement signal portion corresponding to each said frequency pass band set by said control circuit and selects at least one of said different frequency pass bands corresponding to said frequency of said passive electromagnetic signal based on a predetermined criteria applied to said corresponding measurement signal portions.

2. The locator as in claim 1, wherein said frequency pass bands of said plurality of frequency pass bands do not overlap each other.

3. The locator as in claim 1, wherein said control circuit is configured to sequentially set said different frequency pass bands in a consecutive order.

4. The locator as in claim 1, wherein said frequency pass bands of said plurality of frequency pass bands are adjacent to each other.

5. The locator as in claim 3, wherein said control circuit initially sets said bandpass circuit to a said frequency pass band of said plurality of different frequency pass bands at an end of said measurement frequency range and thereafter sets said bandpass circuit to consecutive said frequency pass bands of said plurality of different frequency pass bands to an opposite end of said measurement frequency range.

6. The locator as in claim 1, including an analog-to-digital converter operatively disposed between said bandpass circuit and said control circuit.

7. The locator as in claim 1, including a memory, and wherein said control circuit stores said corresponding measurement signal portions in said memory.

8. The locator as in claim 1, wherein said control circuit selects said at least one of said different frequency pass bands based on a comparison of signal strength of said corresponding measurement signal portions.

9. The locator as in claim 1, wherein said measurement frequency range is within approximately 9.6 kHz to 33.2 kHz.

10. The locator as in claim 1, wherein each of said plurality of different frequency pass bands has a frequency width of approximately 0.4 kHz.

11. The locator as in claim 1, wherein each of said plurality of different frequency pass bands has a frequency width within a range of 0.1 kHz to 0.4 kHz.

12. A locator for identifying a passive electromagnetic signal emitted from an underground utility, said locator comprising:
    a portable housing;
    an antenna disposed within said housing;
    a control circuit disposed within said housing, said control circuit including a memory; and
    a frequency bandpass circuit disposed within said housing operatively between said antenna and said control circuit so that said bandpass circuit receives measurement signals from said antenna corresponding to electromagnetic signals received by said antenna and passes to said control circuit a portion of said received measurement signals within a frequency pass band,
    wherein said control circuit sequentially sets said bandpass circuit to a plurality of different frequency pass bands within a measurement radio frequency range expected to include a frequency of said passive electromagnetic signal, receives said measurement signal portion corresponding to each said frequency pass band set by said control circuit, stores said corresponding measurement signal portions in said memory, compares signal strengths of said stored measurement signal portions and selects at least one of said different frequency pass bands corresponding to said frequency of said passive electromagnetic signal based on a signal strength comparison.

13. The locator as in claim 12, wherein said housing includes an operator interface in communication with said control circuit, and where said control circuit sequentially sets said bandpass circuit to said plurality of different frequency pass bands responsively to an operator instruction received through said interface.

14. The locator as in claim 12, wherein said measurement frequency range is within approximately 9.6 kHz to 33.2 kHz.

15. A method of identifying a passive electromagnetic signal emitted from an underground utility, said method comprising the steps of:
    disposing a portable above ground antenna at a location at which said passive electromagnetic signal is expected;
    receiving measurement signals from said antenna corresponding to electromagnetic signals received by said antenna;
    measuring said measurement signals at a plurality of different frequency bands within a measurement frequency range expected to include a frequency of said passive electromagnetic signal; and selecting at least one of said plurality of frequency bands corresponding to said frequency of said passive electromagnetic signal based on a predetermined criteria applied to measurements made at said measuring step.

16. The method as in claim 15, wherein said frequency bands do not overlap each other.

17. The method as in claim 16, wherein said measuring step includes measuring at said frequency bands in a consecutive frequency order.

18. The method as in claim 15, wherein said frequency bands are adjacent to each other.

19. The method as in claim 15, wherein said measurement frequency range is within approximately 9.6 kHz to 33.2 kHz.

20. The method as in claim 17, wherein said measuring step includes initially measuring said measurement signals at a said frequency band at an end of said measurement frequency range and thereafter measuring said measurement signals at consecutive said frequency bands to an opposite end of said measurement frequency range.

21. A method for identifying a passive electromagnetic signal emitted from an underground utility, said method comprising the steps of:

disposing a portable above-ground antenna at a location at which said passive electromagnetic signal is expected;

receiving measurement signals from said antenna corresponding to electromagnetic signals received by said antenna;

measuring the strength of said measurement signals at a plurality of different frequency bands within a measurement frequency range expected to include a frequency of said passive electromagnetic signal;

comparing signal strengths of said measurement signals from said measuring step; and selecting at least one of said frequency bands corresponding to said frequency of said passive electromagnetic signal based on comparison of said signal strengths.

22. The method as in claim 21, wherein said selecting step includes selecting a said frequency band corresponding to the highest said signal strength measured at said measuring step.

23. A method of identifying a passive electromagnetic signal emitted from an underground utility, said method comprising the steps of:

providing a portable above ground locator comprising
a housing,
an antenna disposed within said housing,
a control circuit, and
a frequency bandpass circuit disposed operatively between said antenna and said control circuit and defining a frequency pass band, disposing said portable above ground locator at a location at which said passive electromagnetic signal is expected so that said antenna receives said passive electromagnetic signal and said bandpass circuit receives measurement signals from said antenna corresponding to said passive electromagnetic signal received by said antenna and passes to said control circuit a portion of said received measurement signals within said frequency pass band;

activating said control circuit so that said control circuit sequentially sets said frequency bandpass circuit to a plurality of different frequency pass bands within a measurement frequency range expected to include a frequency of said passive electromagnetic signal, receives said measurement signal portion corresponding to each said frequency pass band set by said control circuit, and selects at least one of said different frequency pass bands corresponding to said frequency of said passive electromagnetic signal based on a predetermined criteria applied to said corresponding measurement signal portions.

24. The method as in claim 23, wherein said control circuit sequentially sets said different frequency pass bands in a consecutive order.

25. The method as in claim 23, wherein said portable above ground locator includes a memory, and wherein said control circuit stores said corresponding measurement signal portions in said memory.

26. The method as in claim 23, wherein said control circuit selects said at least one of said different frequency pass bands based on a comparison of signal strength of said corresponding measurement signal portions.

27. The method as in claim 23, wherein each of said plurality of different frequency pass bands has a frequency width of approximately 0.4 kHz.

28. The method as in claim 23, wherein each of said plurality of different frequency pass bands has a frequency width within a range of 0.1 kHz to 0.4 kHz.

* * * * *